United States Patent
Watanabe et al.

(10) Patent No.: US 7,142,879 B2
(45) Date of Patent: Nov. 28, 2006

(54) MOBILE COMMUNICATIONS NETWORK SYSTEM, MOBILE TERMINAL, AND PAGING METHOD

(75) Inventors: Yugo Watanabe, Yokohama (JP); Satoshi Hiyama, Yokohama (JP); Shoichi Hirata, Fuchu (JP)

(73) Assignee: NTT DoCoMo, Inc., Tokyo (JP)

( * ) Notice: Subject to any disclaimer, the term of this patent is extended or adjusted under 35 U.S.C. 154(b) by 121 days.

(21) Appl. No.: 10/837,760

(22) Filed: May 4, 2004

(65) Prior Publication Data

US 2004/0248574 A1 Dec. 9, 2004

(30) Foreign Application Priority Data

May 7, 2003 (JP) ............... 2003-129463

(51) Int. Cl.
*H04Q 7/20* (2006.01)

(52) U.S. Cl. ............... 455/458; 455/435.1; 455/435.2; 455/567

(58) Field of Classification Search ............ 455/426.1, 455/432.1, 432.3, 435.1, 435.2, 435.3, 445, 455/456.3, 458, 515, 552.1, 553.1, 567
See application file for complete search history.

(56) References Cited

U.S. PATENT DOCUMENTS

| | | | |
|---|---|---|---|
| 5,555,553 A * | 9/1996 | Jonsson ............... 379/214.01 |
| 5,613,213 A * | 3/1997 | Naddell et al. .......... 455/435.2 |
| H1641 H | 4/1997 | Sharman |
| 5,742,905 A * | 4/1998 | Pepe et al. ................ 455/461 |
| 5,854,985 A | 12/1998 | Sainton et al. |
| 5,903,832 A * | 5/1999 | Seppanen et al. ........ 455/435.3 |
| 6,459,362 B1 * | 10/2002 | Jonsson ..................... 340/7.58 |
| 6,603,755 B1 * | 8/2003 | Parker ........................ 370/342 |
| 6,625,451 B1 * | 9/2003 | La Medica et al. ......... 455/434 |
| 6,792,278 B1 * | 9/2004 | Ahmavaara et al. ........ 455/461 |
| 6,961,329 B1 * | 11/2005 | Bender et al. .............. 370/342 |
| 2001/0012787 A1 * | 8/2001 | Wortham ..................... 455/552 |
| 2002/0019241 A1 * | 2/2002 | Vialen et al. ............... 455/458 |
| 2002/0039892 A1 * | 4/2002 | Lindell ..................... 455/151.1 |

(Continued)

FOREIGN PATENT DOCUMENTS

CN 1335032 A 2/2002

(Continued)

OTHER PUBLICATIONS

Qian Tian et al., "Location Management in a Heterogeneous Network Environment", IEEE WCNC 2000, pp. 753-758.

(Continued)

*Primary Examiner*—William Trost
*Assistant Examiner*—James D Ewart
(74) *Attorney, Agent, or Firm*—Crowell & Moring LLP

(57) ABSTRACT

A mobile communication network system is provided in which when a radio system is selected from plural types of radio systems as a radio system for use in paging, the optimum radio system for the mobile terminal to be paged can be selected. When it is selected, traffic does not concentrate on a specific radio system, or no excess delay occurs when the mobile terminal starts communications. When the mobile communications network system performs paging as a paging notification to a mobile terminal through any one of various radio systems under a communications environment in which radio waves of various radio systems having different communication systems are used, a radio system is selected from a plurality of radio systems depending on the application used in the communications of the paging requested mobile terminal and a paging operation is performed through the selected radio system when a paging request is issued.

5 Claims, 9 Drawing Sheets

U.S. PATENT DOCUMENTS

| | | | |
|---|---|---|---|
| 2002/0082005 A1* | 6/2002 | Ikeda et al. | 455/426 |
| 2002/0087674 A1 | 7/2002 | Guilford et al. | |
| 2002/0090975 A1* | 7/2002 | Laiho et al. | 455/552 |
| 2003/0013442 A1* | 1/2003 | Holmes et al. | 455/426 |
| 2003/0148777 A1 | 8/2003 | Watanabe et al. | |
| 2003/0171126 A1* | 9/2003 | Blink et al. | 455/458 |
| 2004/0102199 A1* | 5/2004 | Haumont | 455/458 |
| 2004/0192301 A1* | 9/2004 | Shi | 455/435.1 |
| 2004/0203692 A1* | 10/2004 | Schwinke et al. | 455/419 |
| 2004/0203745 A1* | 10/2004 | Cooper | 455/432.1 |
| 2004/0235476 A1* | 11/2004 | Martlew | 455/436 |
| 2005/0037755 A1* | 2/2005 | Hind et al. | 455/435.3 |

FOREIGN PATENT DOCUMENTS

| | | |
|---|---|---|
| GB | 2 308 039 A | 6/1997 |
| JP | 06-260990 | 9/1994 |
| JP | 2002-112347 | 4/2002 |
| WO | WO 98/37721 A2 | 8/1998 |
| WO | WO 99/31917 A2 | 6/1999 |
| WO | WO 00/28769 A1 | 5/2000 |
| WO | WO 01/15468 A1 | 3/2001 |
| WO | WO 02/37866 A2 | 5/2002 |
| WO | WO 02/063912 A1 | 8/2002 |

OTHER PUBLICATIONS

Gang Wu et al, "MIRAI Architecture for Heterogeneous Network", IEEE Communications Magazine, Feb. 2002, pp. 126-134.

Yi-Bing Lin et al., "Heterogeneous Personal Communications Services: Integration of PCS Systems", IEEE Communications Magazine, Sep. 1996, pp. 106-112.

Mark Stemm et al., "Vertical Handoffs in Wireless Overlay Networks", ACM Monet 1998, pp. 1-29.

Chinese Office Action date Apr. 7, 2006, including English translation (nine (9) pages).

European Search Report dated May 16, 2006 (five (5) pages).

European Search Report dated Jul. 13, 2006 (six (6) pages).

* cited by examiner

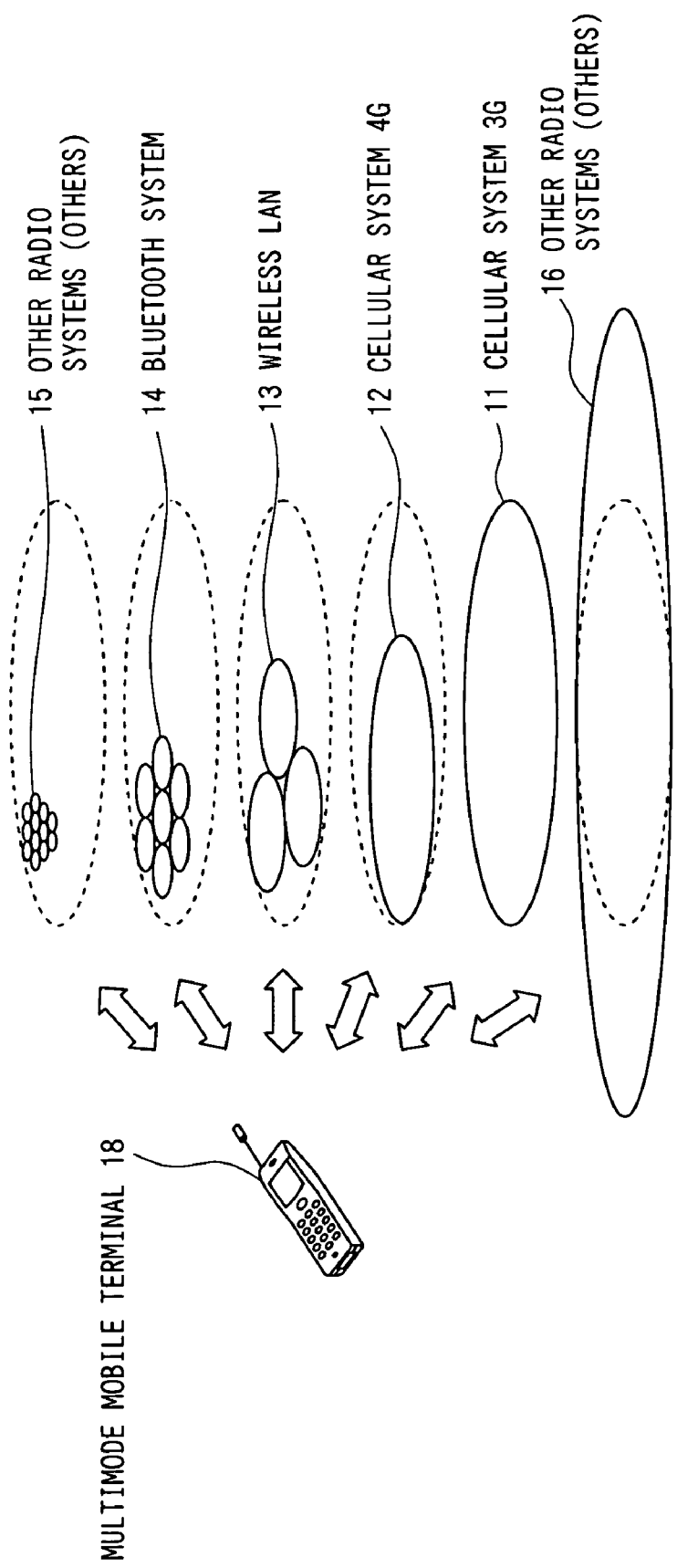

MOBILE COMMUNICATIONS NETWORK SYSTEM, MOBILE TERMINAL, AND PAGING METHOD

BACKGROUND OF THE INVENTION

1. Field of the Invention

The present invention relates to a mobile communications network system, a mobile terminal, and a paging method for issuing a paging notification to, that is, paging, a mobile terminal through any radio system when a multimode mobile terminal receives a call under a communications environment in which radio waves of plural types of radio systems having different communication systems including a cellular system such as a PDC (personal digital cellular), an IMT (international mobile telecommunications)-2000, etc., a wireless LAN system such as an IEEE (institute of electrical and electronics of engineers) 802.11a/b, a Bluetooth system, etc. are used.

2. Description of the Related Art

Recently, in a mobile communications network system, there are plural types of radio systems having different communication systems. Furthermore, for example, in the cellular system, the fourth generation system has been studied and developed with a further higher-speed and larger-capacity system aimed at. In the wireless LAN system, the IEEE 802.11g, etc. has been standardized, and a new radio system such as a UWB (Ultra Wideband), etc. has been studied and developed. In the consideration of the above-mentioned status, it is considered that the radio systems would diversify increasingly in the future.

FIG. 10 shows one feature of the mobile communications network system of the Beyond IMT-2000 in which the service areas of various types of radio systems overlap each other.

That is, FIG. 10 shows the mobile communications network system including cellular systems 11 and 12 of 3G (third generation) and 4G (fourth generation), a wireless LAN 13, a Bluetooth system 14, and other radio systems 15 and 16. Under the environment of such wireless communications, there can be the communications performed by a multimode mobile terminal (hereinafter referred to as a mobile terminal) 18 capable of establishing communications using various radio systems 11 to 16.

In the above-mentioned background, a multimode mobile terminal capable of communicating with plural types of radio systems is actually being developed. First, there is a PHS (personal handyphone system)/PDC dual terminal, and in the future, it is expected to successfully develop a PDC/IMT-2000 dual terminal, an IMT-2000/IEEE 802.11b dual terminal, etc., and the study of a software radio technique is also actively proceeding.

The study of the control of a location under a communications environment in which radio waves of plural types of radio systems are used has been performed.

For example, in the following Non-patent Document 1, the contents relating to the location management database are emphasized, and the location management performed by the mobile terminal on plural types of radio systems is described.

Non-patent Document 2 describes the location registration and the paging performed by a control radio system commonly used in plural types of radio systems referred to as BANs (basic access networks).

Non-patent Document 3 describes the integration of a plurality of PCSs (personal communication systems). Two cases are assumed, that is, when only one radio system is location-registered, and a plurality of (two in this example) radio systems are location-registered. The method for paging a mobile terminal can be first calling through a radio system having the highest priority predetermined in advance, and then completing the calling procedure if a response is returned from the mobile terminal. If there is no response, the calling operation is continuously performed sequentially through the radio system having the highest priority until a response is returned from the mobile terminal.

Patent Document 1 describes a location registering method of a multimode mobile terminal for registering a location by detecting the degeneration of the radio wave status of one radio system and selecting another radio system having a better radio wave status. When plural types of radio systems can be used, a radio system is selected based on the priorities uniformly assigned to all terminals in advance.

Non-patent Document 4 describes a method for switching a radio system referred to as a vertical handoff used by selecting the optimum radio system during the communications of a mobile terminal.

In addition, Patent Document 2 describes a mobile terminal selecting the optimum radio channel from among a plurality of radio channels formed between a radio base station and a mobile terminal in each of a plurality of wireless communications systems based on a predetermined selection standard. The selection standard can be any one of the status of a mobile terminal, the (physical) status of a user of a mobile terminal, the communications contents between a mobile terminal and a destination terminal, the status of a destination terminal, the status of a radio channel, and the cost or the power consumption required for the communications between the mobile terminal and the destination terminal.

(Patent Document 1)
Japanese Patent Laid-Open No. 6-260990 (Abstract, Scope of Claim for the Patent)

(Patent Document 2)
Japanese Patent Laid-Open No. 2002-112347 (Abstract, Scope of Claim for the Patent, Embodiments of the Invention on page 10)

(Non-patent Document 1)
"Location Management in a Heterogeneous Network Environment"
Author: Qing Tian, Donald C. Cox (Stanford Univ.)
Published in: IEEE Wireless Communications and Networking Conference (WCNC) 2000

(Non-patent Document 2)
"MIRAI Architecture for Heterogeneous Network"
Author: Gang Wu, Mitsuhiko Mizuno (Communication Research Laboratory) and Paul J. M. Havinga (University of Twente, the Netherlands) Published in: IEEE Communication Magazine, February 2002

(Non-patent Document 3)
"Heterogeneous Personal Communications Services: Integration of PCS Systems"
Author: Yi-Bing Lin (National Chaio Tung Univ.), Imrich Chlamtac (Boston Univ.)
Published in: IEEE Communication Magazine, September 1996

(Non-patent Document 4)
"Vertical Handoffs in Wireless Overlay Networks"
Author: Mark Stemm, Randy H. Katz (U. C. Berkeley)
Published in: ACM Mobile Networking (MONET), 1998

There are the following problems with the above-mentioned conventional mobile communications network systems.

In Non-patent Document 1, the contents relating to the location management database are emphasized, and it is assumed that the mobile terminal performs location management on plural types of radio systems. However, there are no detailed descriptions as to how a radio system is selected and the paging is performed.

Since the Non-patent Document 2 describes the location registration and the paging performed by a control radio system commonly used in a plurality of radio systems referred to as BANs (basic access networks), the radio system for performing the location registration and the paging is fixedly determined. Therefore, it is assumed that traffic can concentrate on one radio system. Additionally, as a radio system for use during communications, there can be the method of selecting the optimum radio system different from a radio system for performing the paging. In this case, the interface of the radio system for use in the communications after the paging is activated, and a number of processes are required for reserving communications channels, etc. Therefore, there can be the problem of a delay of the communication starting time.

As in Non-patent Document 4, there can be the method of the mobile terminal selecting and using the optimum radio system during the communications. However, in this method, since the mobile terminal can select a radio system only during the communications of the mobile terminal, the optimum radio system cannot be necessarily selected when the communications of the mobile terminal are started.

In Non-patent Document 3, the location registration is performed on plural types of radio systems, that is, the location registration areas of plural types of radio systems can be managed as the location information about the mobile terminal currently not performing communications.

However, in Non-patent Document 3, a mobile terminal is called through a terminal having the highest-priority, and when a response is returned from the mobile terminal, the calling procedure is completed. Therefore, if the radio system having the highest priority is continuously applied, traffic concentrates on the radio system.

Patent Document 1 selects and location-registers the radio system having a good radio wave status when the current radio wave status degrades, and when the entire radio system is available, a radio system is selected and location-registered based on the priority set in advance. Therefore, a radio system for use in the paging cannot be selected.

According to Patent Document 2, the radio system is selected (switched) during the communications. Therefore, when the communications are started, the optimum radio system is not always selected. Furthermore, since only the mobile terminal selects a radio system, a radio system cannot be selected with the network status appropriately taken into account.

In addition, each type of the existing radio systems has a different feature respectively, and has its own merits and demerits. For example, the cellular system excels in the QoS (Quality of Service) guarantee technique for guaranteeing a predetermined communication speed by reserving a band for specific communications, and an area cover. However, it is hard to provide a high-speed transmission, and requires a relatively high-priced communications fee.

The wireless LAN can provide a high-speed transmission at a relatively low-priced communications fee. However, it provides a local area cover, and has not established a sufficient QoS guarantee technique at the present time.

Furthermore, in the current mobile communications network system, selecting the optimum radio system for a mobile terminal during paging has not been realized.

SUMMARY OF THE INVENTION

The present invention has been developed to solve the above-mentioned problems, and aims at providing a mobile communications network system, a mobile terminal, and a paging method capable of selecting the optimum radio system for a mobile terminal to be paged when a radio system for use in paging is selected from among plural types of radio systems without concentrating traffic on a specific radio system during selection, and without generating an excess delay when the communications of the mobile terminal are started.

To attain the above-mentioned objective, the mobile communications network system of the present invention performs paging as a paging notification to a mobile terminal through one of various radio systems when a paging request is issued to the mobile terminal under a communications environment in which radio waves of various radio systems having different communication systems are used, and includes control means having a table, in which identification information of a mobile terminal, application identification information for use in communications of the mobile terminal are associated with location registration area information formed in one radio system, referring to the table when the paging request is issued and selecting a location registration area of a radio system corresponding to an application used in communications of a paging requested mobile terminal, and performing the paging on the selected location registration area.

With the configuration, the table associates the application of the communications with the location registration area of the radio system. Generally, the QoS request for a channel depends on an application. The parameter indicating the QoS request can be a transmission speed, a delay, the fluctuation, etc. For example, the real-time usability is important for the voice communications. If a certain transmission speed is reserved, the request for a delay and fluctuation becomes relatively high. On the other hand, since the real-time usability is not so important for E-mail, Web browsing, etc. the request for a delay and fluctuation is low and the request for a transmission speed becomes relatively high. From the aspect of a radio system, the features of radio systems relating to the above-mentioned QoS parameters, that is, the transmission speed, the delay, and the fluctuation, are different and indicate respective merits and demerits. Therefore, from the request condition for the above-mentioned application and the features of the radio system, the application and the radio systems for use in paging mobile terminal can be associated with each other in advance.

Furthermore, in the mobile communications network system of the present invention, the control means detects the network status such as the radio wave status in each radio system, the traffic status, the node fault, etc., and changes the table according to the detected network status.

With the above-mentioned configuration, if traffic, which is one network status, concentrates on the location registration area selected for paging, then another location registration area on which traffic does not concentrates can be selected.

In the mobile communications network system of the present invention, the control means obtains user information indicating the personal preference of a user of the mobile terminal about the communications conditions, and selects the location registration area of the radio system corresponding to the user information as an area for the paging.

With the above-mentioned configuration, the location registration area of the radio system corresponding to the user information is selected. Since the user information indicates the personal preference of the user about the communications condition, for example, when the user uses the mobile terminal, the user can pay a high communications fee to obtain a better communications environment, or can accept a normal communications environment and pay a low-priced communications fee depending on each user. Therefore, a paging area of the optimum radio system can be selected for paging by reflecting the user information on the selection of the location registration area of a radio system.

In the mobile communications network system of the present invention, when the mobile terminal detects the advertisement information from a specific radio system, and issues a location registration request to the detected specific radio system, the control means selects the location registration area of the radio system to which the location registration request has been issued as an area for the paging.

With the above-mentioned configuration, if the specific radio system is a wireless LAN system capable of providing an inexpensive and high-speed transmission speed for use, for example, in a user home (or office), and if the mobile terminal enters the radio wave range of the wireless LAN system, then the wireless LAN system is automatically selected, thereby allowing the user to use the optimum radio system.

In the mobile communications network system of the present invention, when the mobile terminal detects the advertisement information from a plurality of radio systems and issues a location registration request to the radio system selected corresponding to the terminal status of the mobile terminal from among the plurality of the detected radio systems, the control means selects the location registration area of the radio system to which the location registration request has been issued as an area for the paging.

With the configuration, when the mobile terminal is, for example, in the radio wave area of a cellular system and a wireless LAN system, the location registration area of an efficient radio system for the mobile terminal can be selected as an area for paging. A cellular system is different from a wireless LAN system in communications transmission speed, area cover, etc. When the radio waves of the various radio systems overlap each other and the mobile terminal travels, the paging operation is preferably performed by way of a cellular system if the mobile terminal quickly travels, and the paging operation can be efficiently performed by way of a wireless LAN system when the mobile terminal stops. Thus, the location registration area of the radio system can be selected as an area for paging depending on the terminal status such as the speed of the mobile terminal, etc.

The mobile terminal of the present invention performs communications through various radio systems under a communications environment in which radio waves of various radio systems having different communication systems are used, and includes: first management means in which user information indicating personal preference of a communications condition of user of the mobile terminal is registered; and transmission means for transmitting the user information registered in the first management means to a network system for performing paging on the mobile terminal.

With the configuration, the personal preference of the communications condition of the user can be reflected in the paging, thereby selecting the location registration area of the optimum radio system during paging.

The mobile terminal of the present invention further includes: obtaining means for obtaining advertisement information from various radio systems; and selection means for selecting a specific radio system as a radio system for use in paging to the mobile terminal when the obtaining means obtains advertisement information from the specific radio system, wherein the transmission means transmits a location registration request to the radio system selected by the selection means to the network system.

With the above-mentioned configuration, when a specific radio system is a wireless LAN system capable of providing an inexpensive and high-speed transmission speed, the wireless LAN system is automatically selected, thereby allowing the user to use the optimum radio system.

In the mobile terminal of the present invention, the first management means also manages the user information indicating the paging frequency, etc. of the mobile terminal, the mobile terminal further includes second management means for detecting and managing the terminal status of the mobile terminal, and, when the obtaining means detects the advertisement information from the plurality of radio systems, the selection means selects, as a radio system for use in paging to the mobile terminal, a radio system corresponding to the user information indicating the terminal status of the mobile terminal managed by the second management means and the paging frequency of the mobile terminal managed by the first management means from among the plurality of detected radio systems.

With the above-mentioned configuration, when the mobile terminal is in the radio wave area of the cellular system and the wireless LAN system, the location registration area of an efficient radio system for the mobile terminal can be selected as an area for paging.

The paging method of the present invention issues a paging notification to a mobile terminal through one of various radio systems when a paging request is issued to the mobile terminal under a communications environment in which radio waves of various radio systems having different radio systems are used, wherein when the paging request is issued, a radio system of the various radio systems is selected depending on an application used in communications of a paging requested mobile terminal, and the paging is performed through the selected radio system.

In this method, since the radio system for use in paging is selected depending on the application of the communications related to the radio system, the location registration area of the optimum radio system for the mobile terminal to be paged can be selected from among various radio systems having different features.

In the paging method of the present invention, one of the various radio systems is selected, and the paging is performed through the selected radio system according to at least one of a network status of the various radio systems, user information indicating personal preference of a communications condition of a user of a mobile terminal, a location registration request from a mobile terminal to a specific radio system, a terminal status of a mobile terminal, and a location registration request to a radio system selected according to user information indicating a paging frequency of the mobile terminal.

In this method, a radio system on which traffic concentrates can be avoided, and an efficient radio system for the mobile terminal can be selected, thereby selecting the location registration area of a more effective radio system.

BRIEF DESCRIPTION OF THE DRAWINGS

FIG. 10 shows one of the features of the mobile communications network system of Beyond IMT-2000.

DETAILED DESCRIPTION OF THE PREFERRED EMBODIMENTS

The embodiments of the present invention are described below by referring to the attached drawings.

Figure 1:
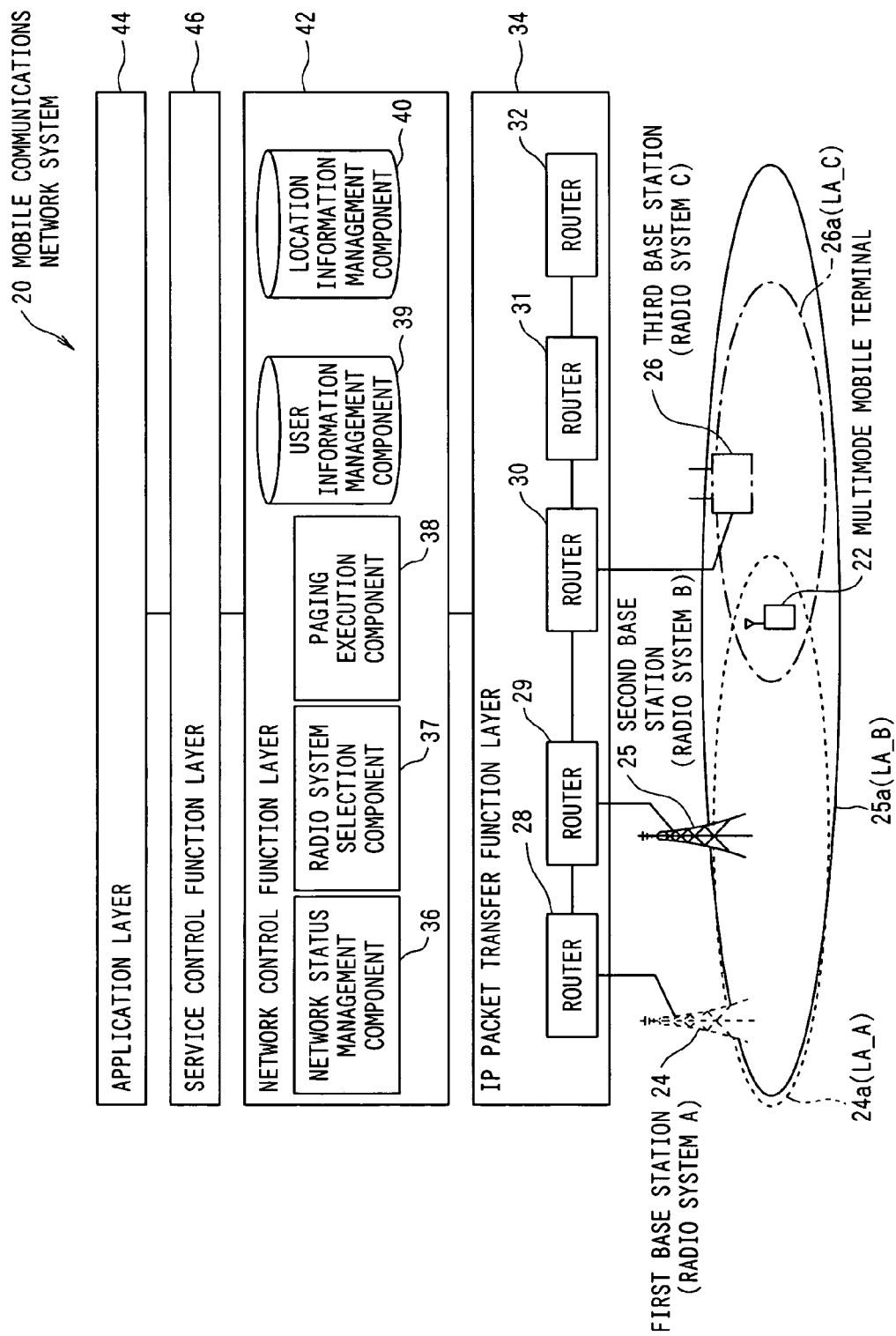
FIG. 1 is a block diagram of the configuration of the mobile communications network system according to an embodiment of the present invention.

FIG. 1 is a block diagram showing the configuration of the mobile communications network system according to an embodiment of the present invention.

A mobile communications network system 20 shown in FIG. 1 comprises first to third base stations 24, 25, and 26 forming radio wave areas (or location registration areas) 24a, 25a, and 26a for performing wireless communications by a multimode mobile terminal 22; an IP (Internet protocol) packet transfer function layer 34 having a plurality of routers 28, 29, 30, 31, and 32; a network control function layer 42 having a network status management component 36, a radio system selection component 37, a paging execution component 38, a user information management component 39, and a location information management component 40; and a service control function layer 46 for controlling a communications service depending on an application layer 44 for use when communications are started.

The application of the present invention can be voice communications and TV phone for use in communications between terminals, E-mail, Web browsing, an instant message, Telnet, FTP, etc., and an application can be assumed by checking the texts of the SYN packet of TCP and the INVITE message of SIP. For example, an application can be specified by the port number of a SYN packet of TCP, and the media type, the available protocol, the medium attribute, etc. of the text of an INVITE message of SIP.

Figure 2:
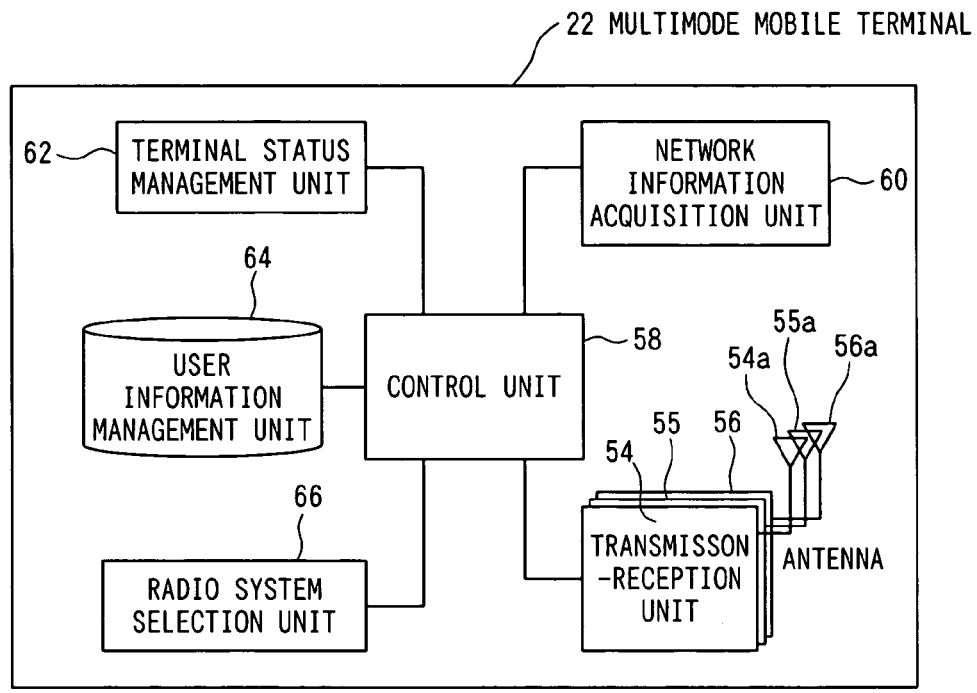
FIG. 2 is a block diagram of the configuration of the multimode mobile terminal of the mobile communications network system according to the embodiment of the present invention.

The multimode mobile terminal 22 has the function of communicating with any of the base stations 24, 25, and 26, and comprises, as shown in FIG. 2, a transmission-reception unit 54 having an antenna 54a for communications with the first base station 24, a transmission-reception unit 55 having an antenna 55a for communications with the second base station 25, a transmission-reception unit 56 having an antenna 56a for communications with the third base station 26, a control unit 58, a network information acquisition unit 60, a terminal status management unit 62, an user information management unit 64, and a radio system selection unit 66.

Described below are the above-mentioned components.

Each of the first to third base stations 24, 25, and 26 is a component of a radio system corresponding to any of different communications system of a 3G or 4G cellular system, a wireless LAN system, a Bluetooth system, etc. For example, the first base station 24 is a component of a cellular system of 4G, the second base station 25 is a component of a cellular system of 3G, and the third base station 26 is a component of a wireless LAN system or a Bluetooth system.

For simple explanation, it is assumed that the first base station 24 is a component of a radio system A, the second base station 25 is a component of a radio system B, and the third base station 26 is a component of a radio system C.

The network control function layer 42 controls the selection of the optimum radio system for use in paging from among the radio systems A, B, and C by the above component units 36 to 40. Described below is each of the component units 36 to 40.

The network status management component 36 manages the network status such as the traffic status of each of the radio systems A, B, and C, the device status such as a fault, the radio wave status of a channel when the communications are started.

Figure 3:
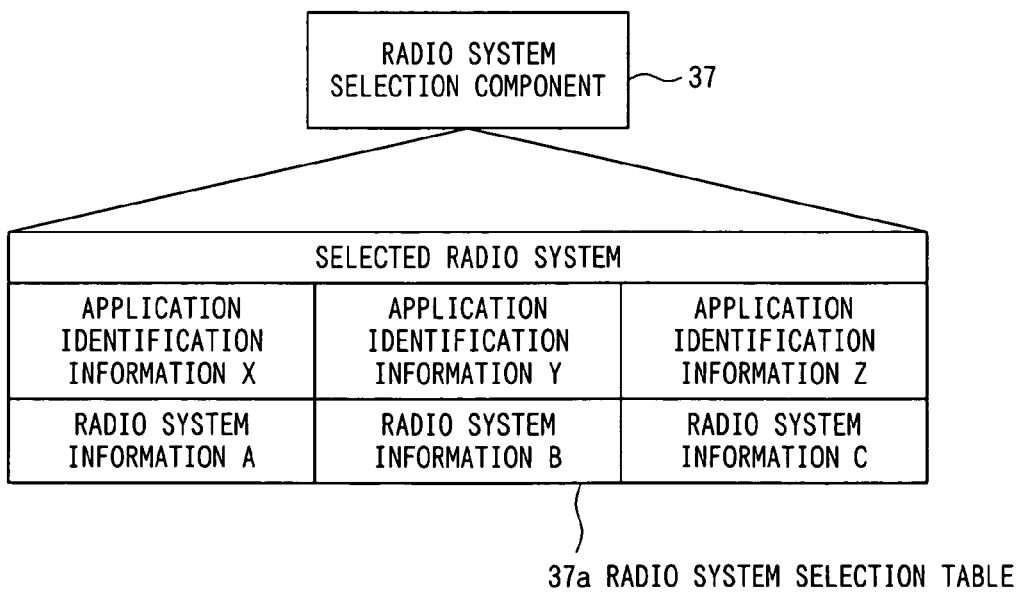
FIG. 3 shows the configuration of the radio system selection table provided for a radio system selection component of the mobile communications network system according to the embodiment of the present invention.

The radio system selection component 37 comprises a radio system selection table 37a shown in FIG. 3 for selection of the optimum radio system for the application layer 44.

The radio system selection table 37a shows the correspondence between various application identification information X, Y, and Z for use at the start of communication and radio systems information A, B, C for identifying radio systems A, B, and C for use in paging.

However, for clearly showing the correspondence relation, the radio system information A, B, and C are assigned the same reference characters as the radio systems A, B, and C. Hereinafter, in the application corresponding to the application identification information X, Y, and Z, the reference characters of the application identification information X, Y, and Z are referred to for easier determination. That is, they are represented as the applications X, Y, and Z.

The correspondence between the application identification information X, Y, and Z and the radio system information A, B, and C is based on the following grounds.

Generally, the QoS request for a channel depends on an application. The parameter indicating the QoS request (hereinafter referred to as a QoS parameter) can be a transmission speed, a delay, the fluctuation, etc. For example, the real-time usability is very important for the voice communications. If a certain transmission speed is reserved, the request for a delay and fluctuation becomes relatively high. On the other hand, since the real-time usability is not so important for E-mail, Web browsing, etc. the request for a delay and fluctuation is low and the request for a transmission speed becomes relatively high.

From the aspect of a radio system, the features relating to the above-mentioned QoS parameters, that is, the transmission speed, the delay, and the fluctuation, are different and indicate respective merits and demerits. Therefore, from the request condition for the above-mentioned application and the features of the radio system, the application and the radio systems for use in paging a radio system can be associated with each other in advance.

Figure 4:
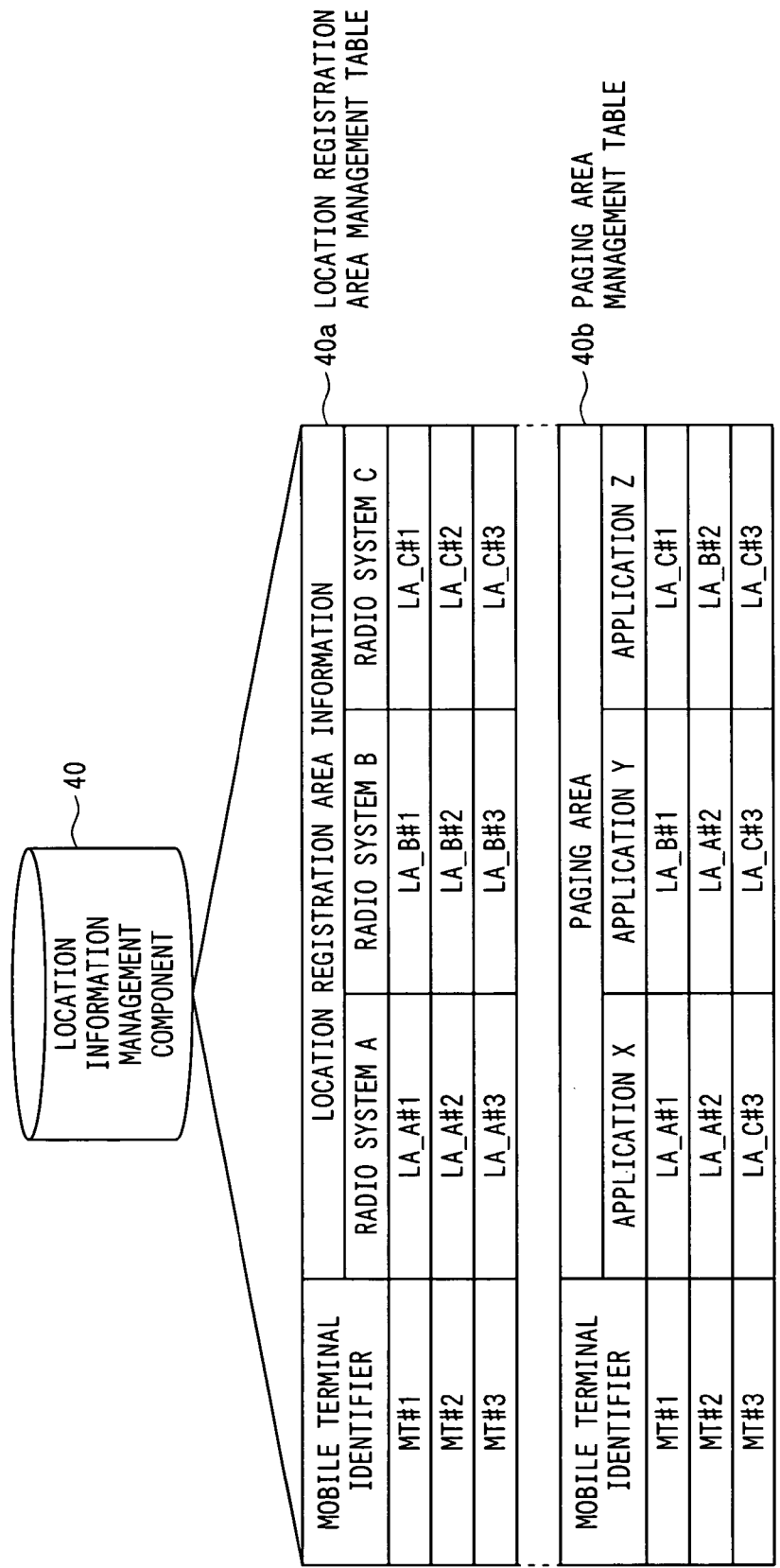
FIG. 4 shows the configuration of the location registration area management table and the paging area management table provided for the location information management component of the mobile communications network system according to the embodiment of the present invention.

The location information management component 40 is provided with a location registration area management table 40a and a paging area management table 40b shown in FIG. 4.

The location registration area management table 40a shows the correspondence between the mobile terminal identifiers MT#1, MT#2, and MT#3 which are the specific identifiers of mobile terminals and the location registration area information LA_A#1, LA_A#2, LA_A#3, LA_B#1, LA_B#2, LA_B#3, LA_C#1, LA_C#2, and LA_C#3 of the radio systems A, B, and C. That is, the location registration area is provided for each radio system, and a mobile terminal registers and updates for each radio system the location registration area available depending on the own location of each mobile terminal. Hereinafter, all location registration area information is referred to as location registration area information LA_A#1~LA_C#3.

The location registration area information LA_A#1~LA_C#3 is the information for management of the location of the multimode mobile terminal 22, and the information about each radio system. The radio wave areas 24a, 25a, and 26a are respectively assigned as location registration areas LA_A, LA_B, and LA_C. Generally, a location registration area is formed by a plurality of cells. However, according to the present embodiment, the configuration is not limited to the general configuration, and includes a location registration area configured by a single cell.

Since the mobile communications network system 20 has a communications environment in which radio waves of radio systems A, B, and C are used, the radio wave areas 24a, 25a, and 26a overlap each other as shown in FIG. 1. In the overlap areas, the multimode mobile terminal 22 can register all information in the location registration areas LA_A, LA_B, and LA_C of the radio systems A, B, and C.

Thus, the location registration area management table 40a shows, for example, the correspondence between the mobile terminal identifier MT#1 and the location registration area information LA_A#1, LA_#B1, and LA_C#1 registered in the location registration areas LA_A, LA_B, and LA_C of the radio systems A, B, and C respectively. Similarly, the mobile terminal identifier MT#2 is associated with the location registration area information LA_A#2, LA_#B2, and LA_C#2, and the mobile terminal identifier MT#3 is associated with the location registration area information LA_A#3, LA_#B3, and LA_C#3.

The paging area management table 40b is a correspondence table for use in determining the paging of which location registration areas LA#A, LA#B, and LA#C, that is, the paging area, depending on the applications X, Y, and Z when the multimode mobile terminal 22 receives a call.

In this example of the paging area management table 40b, the mobile terminal identifier MT#1 is associated with the location registration area information LA_A#1 as a paging area for the application X, the location registration area information LA_B#1 as a paging area for the application Y, and the location registration area information LA_C#1 as a paging area for the application Z.

Likewise, the mobile terminal identifier MT#2 is associated with the location registration area information LA_A#2 as a paging area for the application X, the location registration area information LA_A#2 as a paging area for the application Y, and the location registration area information LA_B#2 as a paging area for the application Z.

The mobile terminal identifier MT#3 is associated with the location registration area information LA_C#3 as a paging area for the application X, the location registration area information LA_C#3 as a paging area for the application Y, and the location registration area information LA_C#3 as a paging area for the application Z.

The user information management component 39 manages the information about a user (hereinafter referred to as user information) owning the multimode mobile terminal 22 transmitted from the multimode mobile terminal 22.

Since the user information indicates the personal preference of the user about the communications condition, for example, when the user uses the mobile terminal, the user can pay a high communications fee to obtain a better communications environment, or can accept a normal communications condition and pay a low communications fee depending on each user. Thus, the request condition for the system depends on each user.

Therefore, the optimum paging area for each user can be determined in paging by reflecting the user information on the paging area management table 40b. That is, the optimum radio system can be selected during paging.

The reflection of the user information is performed by the user operating the user information management unit 64 of the multimode mobile terminal 22 shown in FIG. 2 to set the correspondence relation between the application identification information X, Y, and Z and the radio system information A, B, and C shown in radio system selection table 37a in FIG. 3, transmitting the set correspondence information to the user information management component 39, and reflecting it on the paging area management table 40b.

For example, when the application X is associated with the radio system B depending on the personal preference of a user, the correspondence relation between the X and B is set in the multimode mobile terminal 22, and transmitted to the user information management component 39. In this case, in the example shown in FIG. 3, the application identification information X is associated with the radio system information A, but the application X is associated with the location registration area of the radio system B as a paging area in the paging area management table 40b in FIG. 4.

The paging execution component 38 executes the paging to the multimode mobile terminal 22 of the paging area determined by the location information management component 40.

The user information management unit 64 shown in FIG. 2 manages the correspondence relation between the application identification information X, Y, and Z and the radio system information A, B, and C, and the terminal information about the paging frequency, etc. of the mobile terminal.

The network information acquisition unit 60 obtains the location registration area information LA_A#1~LA_C#3 contained in the advertisement information transmitted by the base stations 24, 25, and 26 of the radio systems A, B, and C, and the service area information about the size of the service area, the transmission speed of communications, etc.

The terminal status management unit 62 recognizes and manages the terminal status of the traveling speed, etc. of the multimode mobile terminal 22.

The radio system selection unit 66 selects a predetermined radio system from the service area information in the advertisement information obtained by the network information acquisition unit 60, and issues a location registration request to the radio system. The location registration request is made using, as with the information in the paging area management table 40*b*, the location registration area information LA_A#1~LA_C#3 referring to a paging area, and the identification information about the applications X, Y, and Z. Therefore, the contents of the paging area management table 40*b* is updated using the location registration request.

Thus, the radio system for use in paging is selected in the multimode mobile terminal 22 for the following reason. That is, the multimode mobile terminal 22 can be used at home (or office) of the user owing the multimode mobile terminal 22. At the home of the user, it is possible to use a radio system, for example, a wireless LAN system, capable of providing an inexpensive and high-speed transmission speed. The multimode mobile terminal 22 can be applied to use the wireless LAN system only at user home without using out of doors the wireless LAN service provided by an ISP (Internet service provider), etc.

In short, if the multimode mobile terminal 22 is set to select the wireless LAN system only when the multimode mobile terminal 22 detects the service area information contained in the advertisement information transmitted by a base station of wireless LAN system at the user home, the optimum radio system for the user can be used.

The radio system selection unit 66 selects a predetermined radio system based on the traveling speed of the multimode mobile terminal 22 managed by the terminal status management unit 62 and the terminal information such as paging frequency, etc. managed by the user information management unit 64 in addition to the service area information, and issues a location registration request to the radio system.

Thus, the radio system for use in paging is selected in the multimode mobile terminal 22 for the following reason. Generally, a cellular system excels in mobility management, area cover, and battery saving while it is hard for a cellular system to provide a high-speed transmission speed. On the other hand, the wireless LAN system can provide a high-speed transmission speed, the area cover appears a hot spot, cannot support a high-speed traveling of a terminal, and is poor in battery saving.

When the radio waves of a plurality of radio systems having different features overlap each other and the mobile terminal 22 travels, the paging operation is preferably performed by way of a cellular system if the mobile terminal 22 quickly travels, and the paging operation can be efficiently performed by way of a wireless LAN system when the mobile terminal stops.

The control unit 58 controls the entire multimode mobile terminal 22, and the transmission-reception units 54 to 56, the network information acquisition unit 60, the terminal status management unit 62, the user information management unit 64, and the radio system selection unit 66.

Figure 5:
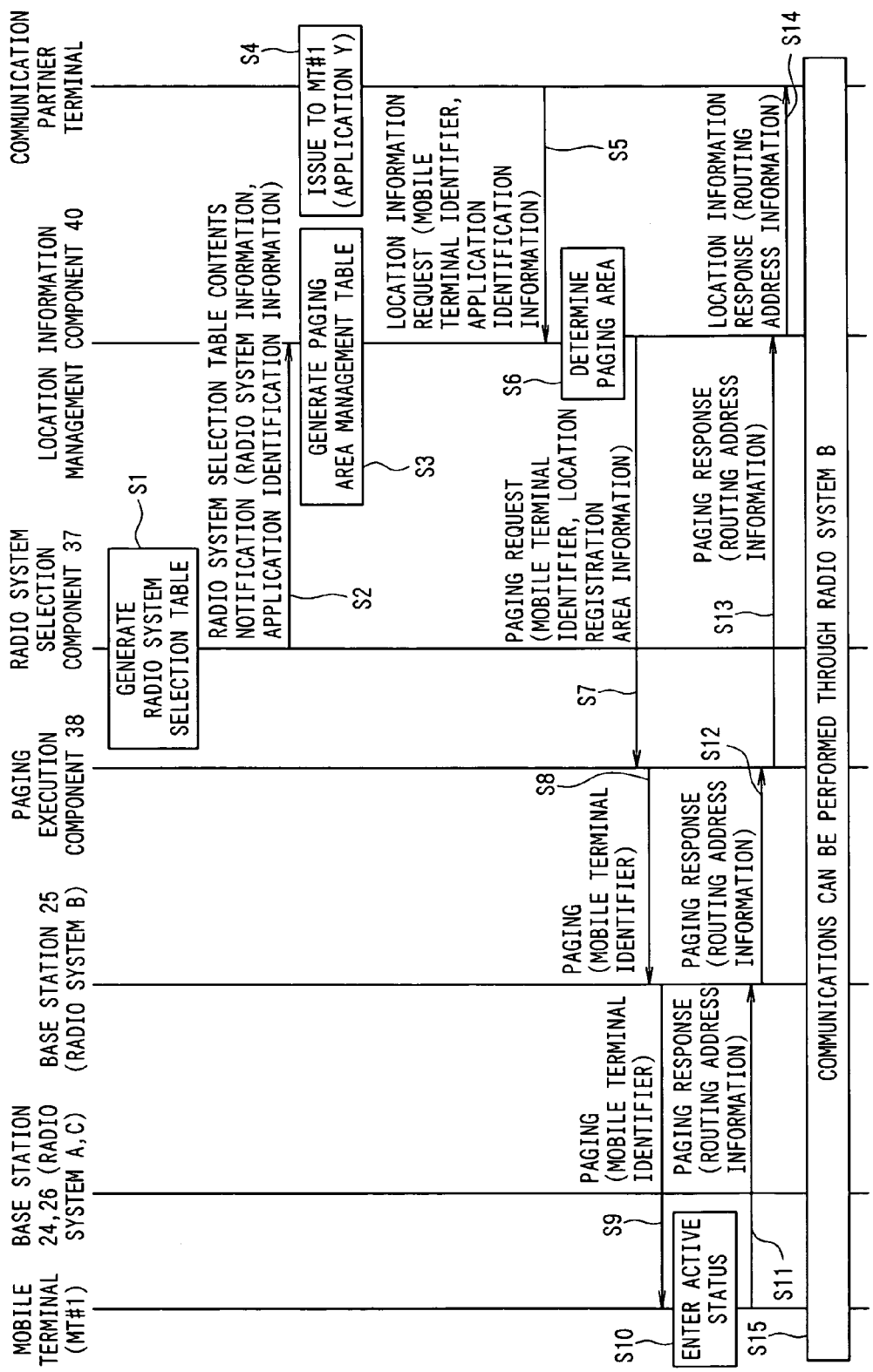
FIG. 5 is a sequence for explanation of the process of selecting a radio system for use in paging a mobile terminal depending on the application used when communications are started in the mobile communications network system according to the embodiment of the present invention.

The process of selecting a radio system used in paging to a mobile terminal depending on the application used when communications are started in the mobile communications network system 20 with the above-mentioned configuration is explained below by referring to the sequence shown in FIG. 5.

First, in step S1, the radio system selection component 37 generates the radio system selection table 37*a* having the contents shown in FIG. 3. In step S2, the radio system information A, B, and C and the application identification information X, Y, and Z of the table 37*a* are announced to the location information management component 40.

The location information management component 40 generates the paging area management table 40*b* depending on the radio system information A, B, and C and the application identification information X, Y, and Z, and the contents of the location registration area management table 40*a* shown in FIG. 4 in step S3.

Then, in step S4, it is assumed that a communication request is generated from the communication partner terminal to the mobile terminal of the mobile terminal identifier MT#1, and the application is Y. For easier identification of a mobile terminal, the reference numeral of the mobile terminal identifier MT#1 is used, and it is represented as a mobile terminal MT#1.

The mobile communications network system 20 receives a paging request to the mobile terminal MT#1. That is, in step S5, the location information request including the mobile terminal identifier MT#1 and the application identification information Y is issued to the location information management component 40.

The location information management component 40 determines a paging area by referring to the paging area management table 40*b* in step S6. In this example, it is determined to which location registration area LA#A, LA#B, or LA#C the paging is performed depending on the application Y. In this case, in the table 40*b*, the mobile terminal identifier MT#1 is associated with the location registration area information LA_B#1 as a paging area for the application Y. Therefore, the location registration area LA_B is determined as a paging area. That is, the radio system B is selected for paging.

In step S7, depending on the determination contents, a paging request is issued to the paging execution component 38. When the request is issued, the mobile terminal identifier MT#1 and the location registration area information LA_B#1 are announced to the paging execution component 38.

Upon receipt of the paging request, the paging execution component 38 performs the paging to the mobile terminal of the mobile terminal identifier MT#1 in steps S8 and S9. That is, it is notified that there is a call from the communication partner terminal to the mobile terminal MT#1 through the base station 25 of the radio system B.

In step S10, the mobile terminal MT#1 enters the active status with reservation of a communications channel. Insteps S11, S12, and S13, the paging response according to the routing address information of the mobile terminal MT#1 is transmitted to the paging execution component 38 through the base station 25, and further to the location information management component 40. In step S14, the routing address information is transmitted as a location information response from the location information management component 40 to the communication partner terminal. Thus, in step S15, the communications between the communication partner terminal and the mobile terminal MT#1 is enabled through the radio system B.

Figure 6:
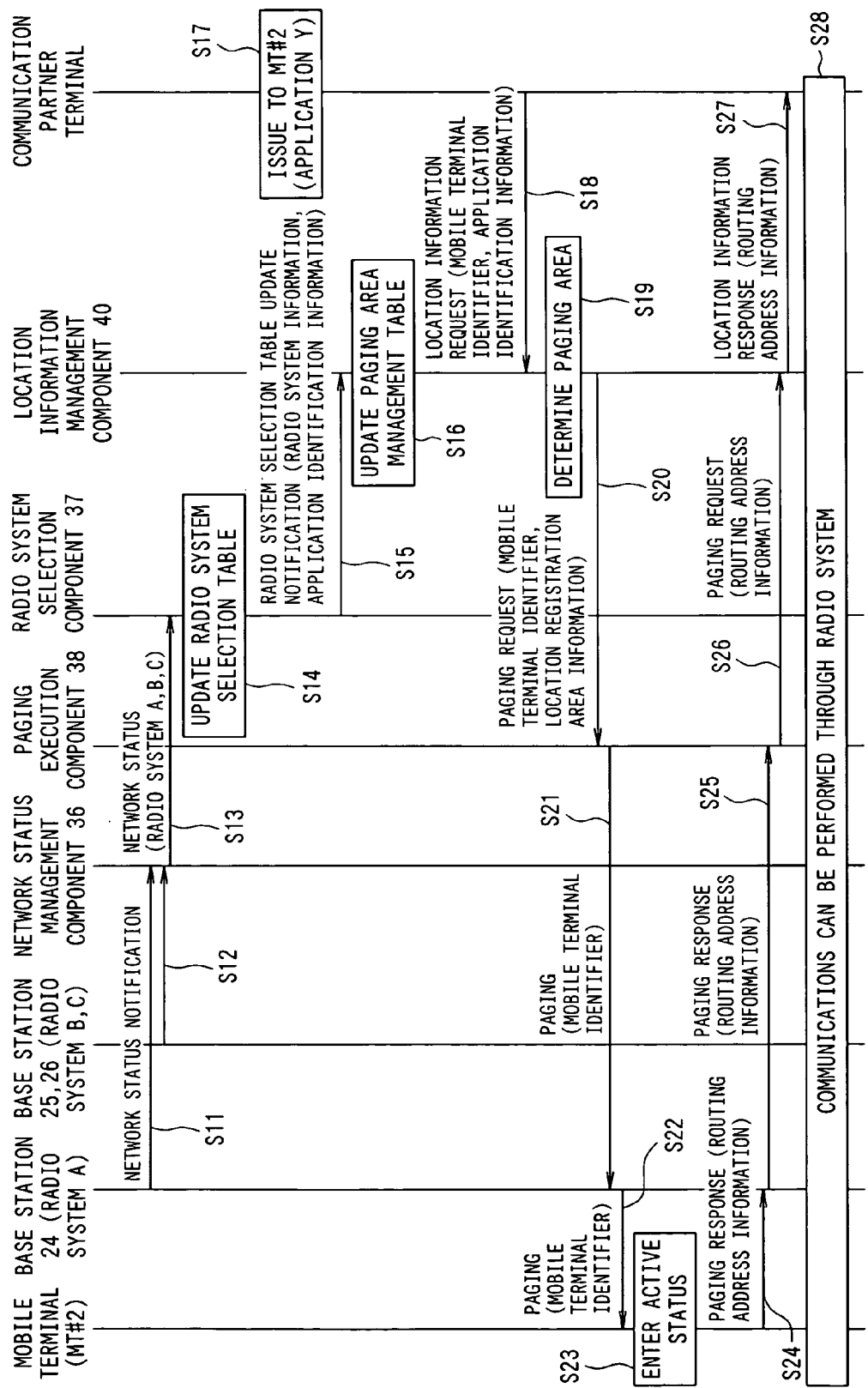
FIG. 6 is a sequence for explanation of the process of selecting a radio system for use in paging a mobile terminal depending on the network status of each type of radio system in the mobile communications network system according to the embodiment of the present invention.

The process of selecting a radio system for use in the paging to the mobile terminal depending on the network status of the radio systems A, B, and C is described below by referring to the sequence shown in FIG. 6. Assume that the contents of the radio system selection table 37a, the location registration area management table 40a, and the paging area management table 40b are the same as the process contents shown in FIG. 5 above.

First, it is assumed that, in step S11, the network status is announced from the radio system A containing the base station 24 to the network status management component 36, and the network status is announced from the radio system B containing the base station 25 and the radio system C containing the base station 26 to the network status management component 36 in step S12. The announced network status is given to the radio system selection component 37 in step S13.

In step S14, the radio system selection component 37 updates the radio system selection table 37a depending on the announced network status. For example, assume that in a network state of the radio system B, traffic concentrates on the communications of the application Y. In this case, in the radio system selection table 37a shown in FIG. 3, the radio system information B is associated with the application identification information Y, but it is updated to the information A about the radio system on which traffic does not concentrate.

In step S15, the update contents of the radio system selection table 37a is announced to the location information management component 40.

In the location information management component 40, the paging area management table 40b is updated based on the update contents in step S16. In this example, as shown in FIG. 4, assume that the location registration area information about the column of the application Y in the row of MT#2 has been updated to LA_A#2.

Then, assume that, in step S17, a communication request is generated to the mobile terminal of the mobile terminal identifier MT#2 from the communication partner terminal, and the application Y is related at this time. Thus, in the mobile communications network system 20, a paging request to the mobile terminal MT#2 is received. That is, in step S18, the location information request including the mobile terminal identifier MT#2 and the application identification information Y is announced to the location information management component 40.

In the location information management component 40, in step S19, a paging area is determined by referring to the paging area management table 40b. That is, depending on the applications, it is determined for which location registration area, LA#A, LA#B, or LA#C the paging is to be performed. In this case, in the paging area management table 40b, the location registration area information LA_A#2 is associated with the mobile terminal identifier MT#2 as a paging area for the application Y. Therefore, the location registration area LA_A is determined as a paging area. That is, the radio system A for use in paging is selected.

In step S20, depending on the determination contents, a paging request is issued to the paging execution component 38. When the request is issued, the mobile terminal identifier MT#2 and the location registration area information LA_A#2 are announced to the paging execution component 38.

Upon receipt of the paging request, the paging execution component 38 performs the paging to the mobile terminal of the mobile terminal identifier MT#2 in steps S21 and S22.

In step S23, the mobile terminal MT#2 enters the active status. In steps S24, S25, and S26, the paging response according to the routing address information of the mobile terminal MT#2 is transmitted to the paging execution component 38 through the base station 24, and further to the location information management component 40. In step S27, the routing address information is transmitted as a location information response from the location information management component 40 to the communication partner terminal. Thus, in step S28, the communications between the communication partner terminal and the mobile terminal MT#2 is enabled through the radio system A.

Figure 7:
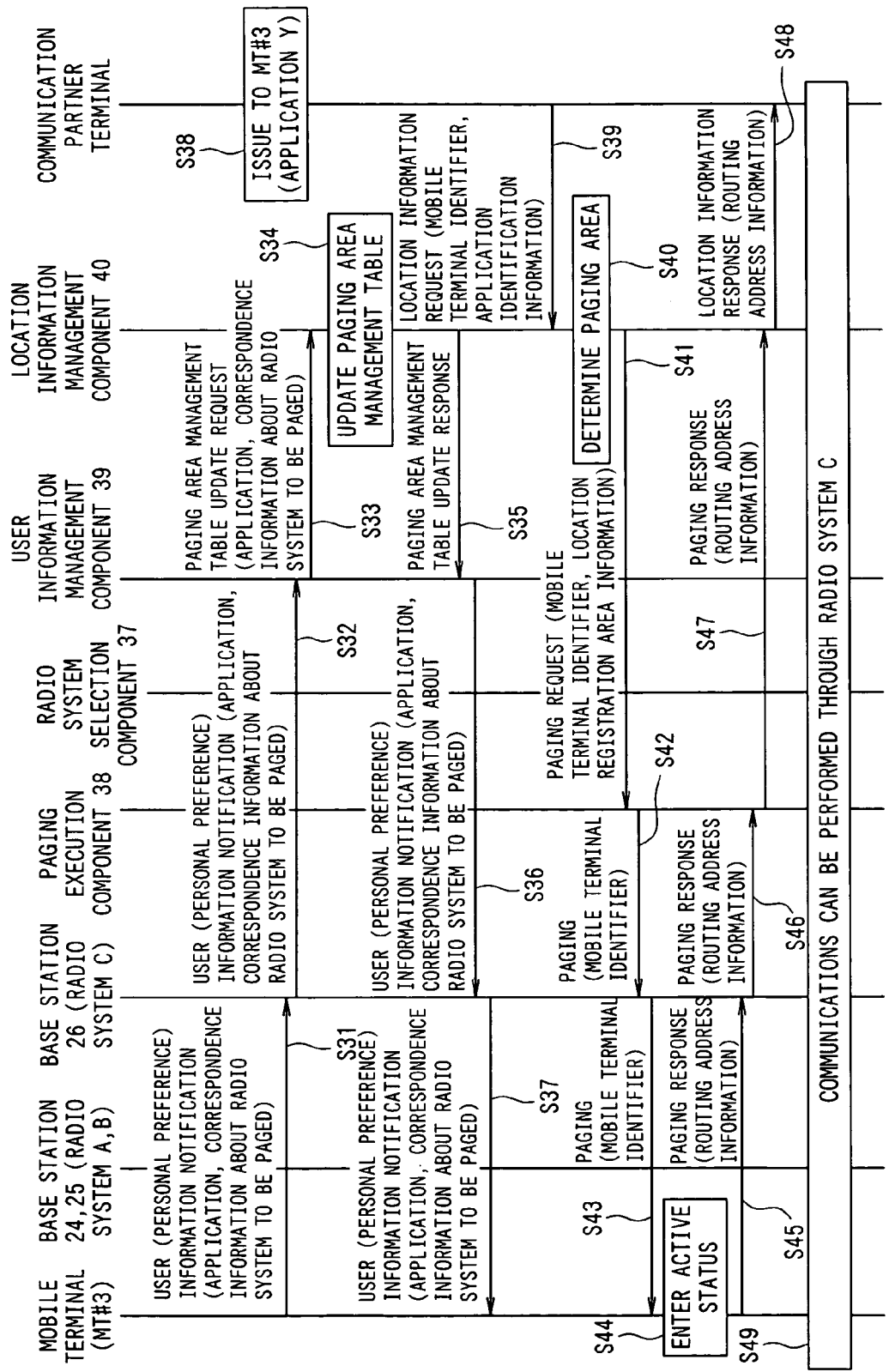
FIG. 7 is a sequence for explanation of the process of selecting a radio system for use in paging a mobile terminal depending on the user information which is personal preference of the communications condition of a user in the mobile communications network system according to the embodiment of the present invention.

Then, the process of selecting a radio system for use in paging to the mobile terminal according to the user information which is the personal preference of a user about the communications condition is described below by referring to the sequence shown in FIG. 7.

For example, assume that the user of the mobile terminal of the mobile terminal identifier MT#3 sets the correspondence relation between the application Y as the personal preference about the communications condition and the radio system C in the user information management unit 64.

The set user (personal preference) information is announced to the base station 26 of the radio system C from the mobile terminal MT#3 in step S31. That is, the control unit 58 in the mobile terminal MT#3 reads the user information set in the user information management unit 64, and it is transmitted from the antenna 56a to the base station 26 through the transmission-reception unit 56.

The transmitted user information is announced from the base station 26 to the user information management component 39 in step S32. Furthermore, in step S33, the user information management component 39 notifies the location information management component 40 of the update request in the paging area management table 40b according to the user information.

In the location information management component 40, the paging area management table 40b is updated according to the user information in step S34. In this example, the location registration area information in the column of the application Y in the row of MT#3 has been updated to LA_C#3 as shown in FIG. 4.

When the response during update of the paging area management table 40b is announced to the user information management component 39 in step S35, the response to the transmission of the user information is returned from the user information management component 39 to the mobile terminal MT#3 through the base station 26 in steps S36 and S37.

Then, in step S38, a communication request is issued from the communication partner terminal to the mobile terminal of the mobile terminal identifier MT#3, and assume that the application is Y. Thus, a paging request to the mobile terminal MT#3 is received in the mobile communications network system 20. That is, in step S39, the location information request containing the mobile terminal identifier MT#3 and the application identification information Y is announced to the location information management component 40.

In the location information management component 40, in step S40, a paging area is determined by referring to the paging area management table 40b. That is, depending on the application Y, it is determined for which location registration area, LA#A, LA#B, or LA#C the paging is to be performed. In this case, in the paging area management table 40*b*, the location registration area information LA_C#3 is associated with the mobile terminal identifier MT#3 as a paging area for the application Y. Therefore, the location registration area LA_C#3 is determined as a paging area. That is, the radio system C for use in paging is selected.

In step S41, depending on the determination contents, a paging request is issued to the paging execution component 38. When the request is issued, the mobile terminal identifier MT#3 and the location registration area information LA_C#3 are announced to the paging execution component 38.

Upon receipt of the paging request, the paging execution component 38 performs the paging to the mobile terminal of the mobile terminal identifier MT#3 in steps S42 and S43.

In step S44, the mobile terminal MT#3 enters the active status. In steps S45, S46, and S47, the paging response according to the routing address information of the mobile terminal MT#3 is transmitted to the paging execution component 38 through the base station 26, and further to the location information management component 40. In step S48, the routing address information is transmitted as a location information response from the location information management component 40 to the communication partner terminal. Thus, in step S49, the communications between the communication partner terminal and the mobile terminal MT#3 is enabled through the radio system C.

Figure 8:
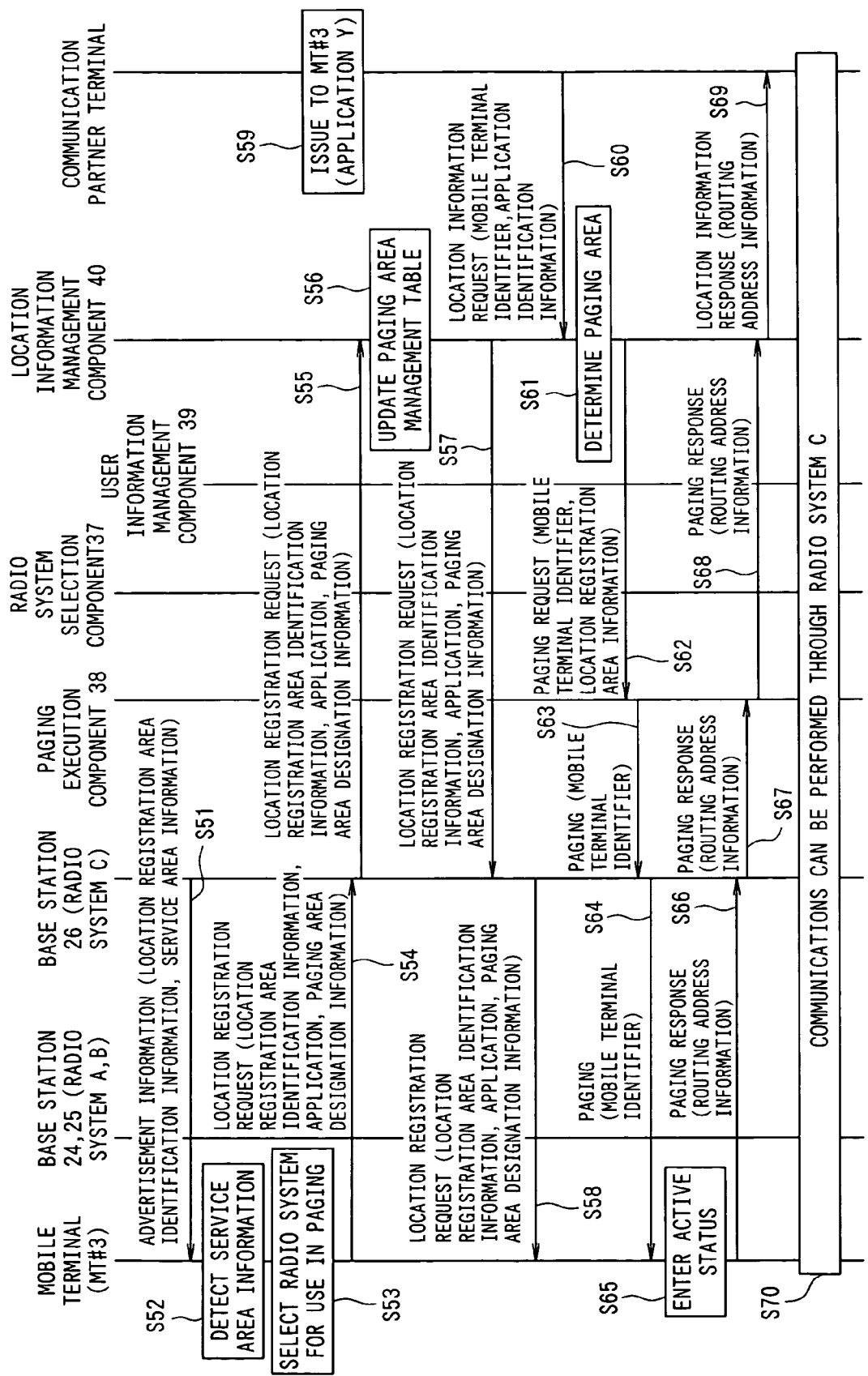
FIG. 8 is a sequence for explanation of the process of selecting a radio system for use in paging a mobile terminal depending on the advertisement information transmitted by each radio system in the mobile communications network system according to the embodiment of the present invention.

The process of selecting a radio system for use in the paging to the mobile terminal according to the advertisement information transmitted by the base stations 24, 25, and 26 of the radio systems A, B, and C is described below by referring to the sequence shown in FIG. 8. However, it is assumed that the radio system C is the wireless LAN system at user home.

First, assume that, in step S51, the advertisement information from the base station 26 of the radio system C is announced to the mobile terminal MT#3, and the network information acquisition unit 60 of the mobile terminal MT#3 has detected the service area information contained in the advertisement information in step S52. Since it is recognized that a notification is issued from the wireless LAN system at home according to the service area information, the radio system selection unit 66 selects the radio system C as a radio system for use in paging in step S53.

Then, in steps S54 and S55, a location registration request to the radio system C is issued to the location information management component 40 through the base station 26. In this case, the location registration request is issued with the location registration area information LA_C#3 associated as a paging area with the application Y.

In the location information management component 40, the paging area management table 40*b* is updated depending on the location registration request in step S56. That is, as shown in FIG. 4, the location registration area information in the column of the application Y in the row of MT#3 is updated to LA_C#3.

The response during update of the paging area management table 40*b* is returned as a response to the location registration request to mobile terminal MT#3 through the base station 26 in steps S57 and S58.

Then, in step S59, a communication request is issued from the communication partner terminal to the mobile terminal of the mobile terminal identifier MT#3, and it is assumed that the application is Y. Thus, a paging request to the mobile terminal MT#3 is received in the mobile communications network system 20. That is, in step S61, the location information request containing the mobile terminal identifier MT#3 and the application identification information Y is announced to the location information management component 40.

In the location information management component 40, in step S61, a paging area is determined by referring to the paging area management table 40*b*. That is, the mobile terminal identifier MT#3 is associated with the location registration area information LA_C#3 as a paging area depending on the application Y. Therefore, the location registration area LA_C is determined as a paging area. That is, a radio system C for use in paging is selected.

In step S62, depending on the determination contents, a paging request is issued to the paging execution component 38. When the request is issued, the mobile terminal identifier MT#3 and the location registration area information LA_C#3 are announced to the paging execution component 38.

Upon receipt of the paging request, the paging execution component 38 performs the paging to the mobile terminal of the mobile terminal identifier MT#3 in steps S63 and S64.

In step S65, the mobile terminal MT#3 enters the active status. In steps S66, S67, and S68, the paging response according to the routing address information of the mobile terminal MT#3 is transmitted to the paging execution component 38 through the base station 26, and further to the location information management component 40. In step S69, the routing address information is transmitted as a location information response from the location information management component 40 to the communication partner terminal. Thus, in step S70, the communications between the communication partner terminal and the mobile terminal MT#3 is enabled through the radio system C.

Figure 9:
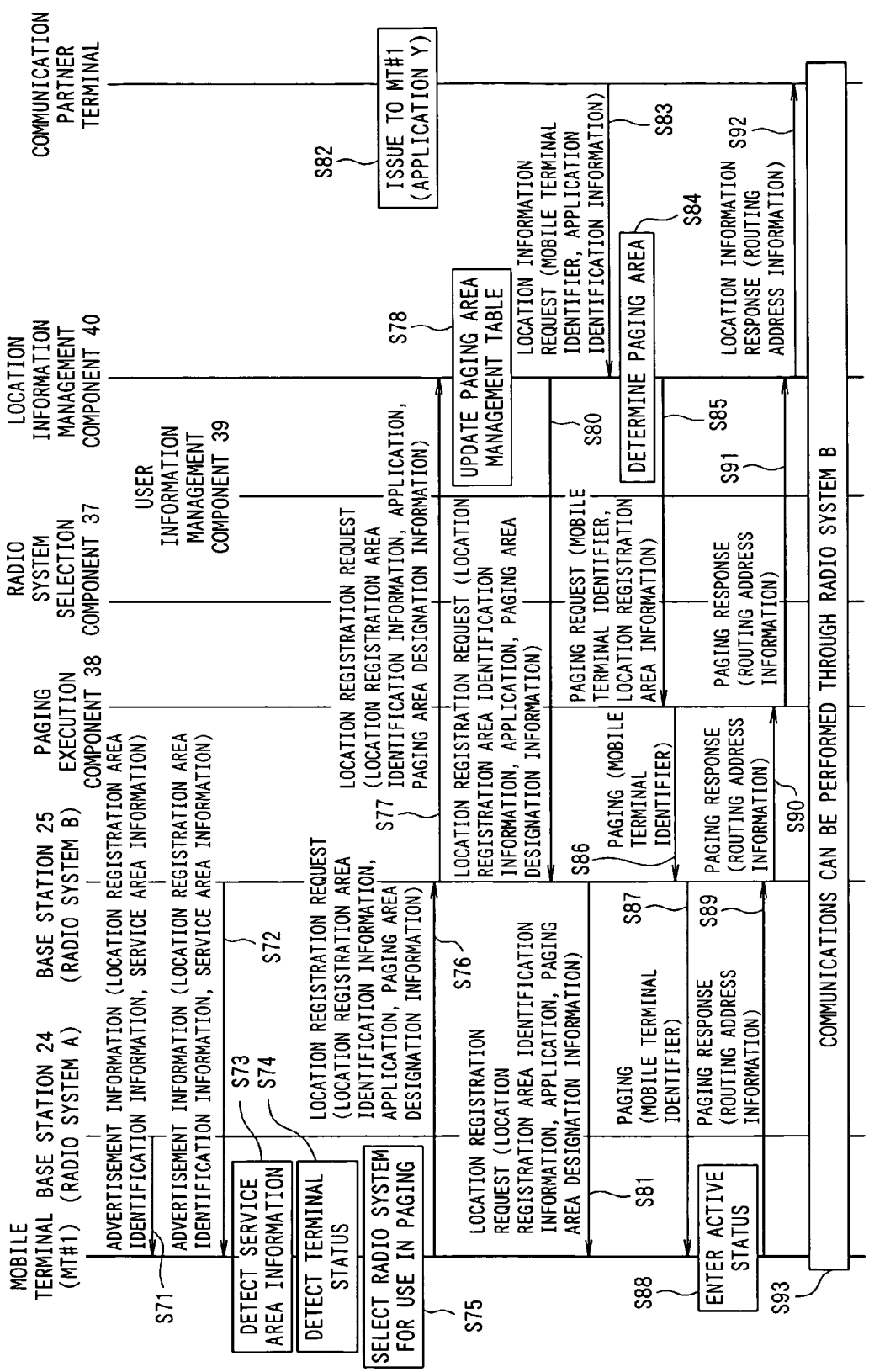
FIG. 9 is a sequence for explanation of the process of selecting a radio system for use in paging a mobile terminal depending on the advertisement information transmitted by each radio system and the terminal information about the mobile terminal in the mobile communications network system according to the embodiment of the present invention.

Then, the process of selecting a radio system for use in the paging to the mobile terminal according to the terminal information indicating the traveling speed of the mobile terminal and the user information indicating the paging frequency in addition to the advertisement information transmitted by the base stations 24, 25, and 26 of the radio systems A, B, and C is described below by referring to the sequence shown in FIG. 9.

First, in step S71, the advertisement information from the base station 24 of the radio system A is announced to the mobile terminal MT#1, and in step S72, the advertisement information from the base station 25 of the radio system B is announced to the mobile terminal MT#3.

Then, in step S 73, it is assumed that the network information acquisition unit 60 of the mobile terminal MT#3 has detected service area information contained in the advertisement information. In step S74, it is assumed that the terminal status management unit 62 has detected the terminal status such as the traveling speed of the mobile terminal.

In step S75, the radio system selection unit 66 recognizes which is the optimum, the radio system A or B according to the terminal status of the mobile terminal MT#1 and the user information indicating the paging frequency managed by the user information management unit 64. As a result, it is recognized that the radio system B is the optimum system and it is assumed that it is selected as a radio system for use in paging.

Then, in steps S76 and S77, a location registration request to the radio system B is issued to the location information management component 40 through the base station 25. In this case, the location registration request is issued with the location registration area information LA_B#1 associated as a paging area with the application Y.

In the location information management component 40, the paging area management table 40*b* is updated at the location registration request in step S78. That is, as shown in FIG. 4, the location registration area information in the column of the application Y in the row of MT#1 is updated to LA_B#1.

The response during update of the paging area management table 40b is returned as a response to the location registration request to mobile terminal MT#1 through the base station 25 in steps S80 and S81.

Then, in step S82, a communication request is issued from the communication partner terminal to the mobile terminal of the mobile terminal identifier MT#1, and it is assumed that the application is Y. Thus, a paging request to the mobile terminal MT#1 is received in the mobile communications network system 20. That is, in step S83, the location information request containing the mobile terminal identifier MT#1 and the application identification information Y is announced to the location information management component 40.

In the location information management component 40, in step S84, a paging area is determined by referring to the paging area management table 40b. That is, the mobile terminal identifier MT#1 is associated with the location registration area information LA_B#1 as a paging area depending on the application Y. Therefore, the location registration area LA_B is determined as a paging area. That is, a radio system B for use in paging is selected.

In step S85, depending on the determination contents, a paging request is issued to the paging execution component 38. When the request is issued, the mobile terminal identifier MT#1 and the location registration area information LA_B#1 are announced to the paging execution component 38.

Upon receipt of the paging request, the paging execution component 38 performs the paging to the mobile terminal of the mobile terminal identifier MT#1 in steps S86 and S87.

In step S88, the mobile terminal MT#1 enters the active status. In steps S89, S90, and S91, the paging response according to the routing address information of the mobile terminal MT# is transmitted to the paging execution component 38 through the base station 25, and further to the location information management component 40. In step S92, the routing address information is transmitted as a location information response from the location information management component 40 to the communication partner terminal. Thus, in step S93, the communications between the communication partner terminal and the mobile terminal MT#1 is enabled through the radio system B.

As described above, according to the mobile communications network system 20 of the present embodiment, when a paging operation is performed, that is, when a paging notification is issued to the multimode mobile terminal 22 through any one of the radio systems A, B, and C when a paging request is issued to the multimode mobile terminal 22 under a communications environment in which radio waves of radio systems A, B, and C having different communication systems are used, the network control function layer 42 has a table which associates the identification information about the multimode mobile terminal 22 with the application identification information for use in the communications of the multimode mobile terminal 22 and the location registration area information formed by any one radio system. When a paging request is issued, the table is referred to, a location registration area of a radio system corresponding to the application used in the communications of the paging requested multimode mobile terminal 22 is selected, and the paging operation is performed on the selected location registration area.

With the above-mentioned configuration, since there is the correlation between an application and a radio system, an application can be associated in advance with a radio system for use in paging. By referring to the correspondence table, the location registration area of a radio system corresponding to the application used in the communications of the paging requested mobile terminal 22 is selected, thereby performing the paging to the selected location registration area. As a result, the location registration area of the optimum radio system for the multimode mobile terminal 22 of the paging target can be selected from among the various radio systems having different features during paging.

That is, the optimum radio system for the mobile terminal to be a paging target can be selected. Furthermore, when a paging request is received from the communication partner terminal, a radio system for use in paging is immediately selected by referring to a table, thereby eliminating excess delay when communications of a mobile terminal are started.

A location registration area of another radio system having no fault in the network status can be selected when the network control function layer 42 detects the location registration area selected for paging and the network status of the radio system forming the location registration area and if there is any fault in the detected network status. Thus, when traffic which is one of network states concentrates on the location registration area selected for paging, another location registration area on which traffic does not concentrate can be selected.

Furthermore, the multimode mobile terminal 22 comprises the user information management unit 64 in which user information indicating the personal preference of a user of the multimode mobile terminal 22 on the communications condition is registered, and the control unit 58 and the transmission-reception units 54 to 56 for transmitting the user information stored in the user information management unit 64 to the network system for paging to the multimode mobile terminal 22. The network control function layer 42 obtains the user information, and selects the location registration area of the radio system satisfying the user information as an area for paging.

Thus, the user information can be reflected in selecting a location registration area of a radio system, and the location registration area of the optimum radio system can be selected in paging.

The multimode mobile terminal 22 further comprises the network information acquisition unit 60 for obtaining advertisement information from the radio systems A, B, and C, and the radio system selection unit 66 for selecting a specific radio system as a radio system for use in paging to the multimode mobile terminal 22 when the acquisition unit 60 obtains advertisement information from the specific radio system, and the control unit 58 and the transmission-reception units 54 to 56 transmit a location registration request to the radio system selected by the radio system selection unit 66 to the network system. When the network control function layer 42 obtains the location registration request, the location registration area of the radio system to which the location registration request is issued can be selected as an area for paging.

Thus, if the specific radio system is, for example, a wireless LAN system capable of providing an inexpensive and high-speed transmission speed for use in a user home (or office), and if the mobile terminal 22 enters the radio wave range of the wireless LAN system, then the wireless LAN system is automatically selected, thereby allowing the user to use the optimum radio system.

The multimode mobile terminal 22 further comprises the terminal status management unit 62 for detecting and managing the terminal status of the multimode mobile terminal 22 such that when the network information acquisition unit 60 detects the advertisement information from a plurality of radio systems, the radio system selection unit 66 can select a radio system depending on the terminal status managed by the terminal status management unit 62 from the plurality of detected radio systems as a radio system for use in paging. When the network control function layer 42 obtains the location registration request to the radio system selected by the multimode mobile terminal 22, the location registration area of the radio system to which the location registration request is issued is selected as an area for use in paging.

Thus, when the mobile terminal 22 is, for example, in the radio wave area of a cellular system and a wireless LAN system, the location registration area of an efficient radio system for the mobile terminal 22 can be selected as an area for paging.

According to Patent Document 2, the radio system is selected (switched) during the communications. Therefore, when the communications are started, the optimum radio system is not always selected. However, in the embodiment of the present invention, a radio system is selected during non-communications. Therefore, the optimum radio system can be selected when the communications are started.

Furthermore, since only the mobile terminal selects a radio system according to the Patent Document 2, a radio system cannot be selected with the network status appropriately taken into account. However, according to the embodiment of the present invention, a radio system can be selected on a network side. Therefore, the optimum radio system can be selected with the network status taken into account.

As described above, according to the present invention, when the mobile communications network system performs paging as a paging notification to a mobile terminal through any one of various radio systems in paging request to the mobile terminal under a communications environment in which radio waves of various radio systems having different communication systems are used, a radio system is selected from among the various radio systems depending on the application used in the communications of the paging requested mobile terminal when a paging request is issued and a paging operation is performed through the selected radio system.

That is, since a radio system is selected for use in paging depending on the application of the communications related in the radio system, the location registration area of the optimum radio system for the mobile terminal to be paged can be selected from among the various radio systems having different features when the paging operation is performed.

When a paging request is issued, the radio system for use in paging can be immediately selected based on the correspondence relation with the application. Therefore, there is no excess delay when the communications of the mobile terminal are started.

Furthermore, a radio system is selected from among the various radio systems, and the paging operation is performed through the selected radio system based on at least one of the network status of the location registration area selected depending on the application and the radio system forming the location registration area, the user information indicating the personal preference of the user of the mobile terminal about the communications condition, the location registration request to a specific radio system from the mobile terminal, and the location registration area to the radio system selected depending on the terminal status of the mobile terminal in a mobile terminal.

With the above-mentioned configuration, the location registration area of the optimum radio system can be selected with a radio system on which traffic concentrates avoided, with an efficient radio system selected by the mobile terminal, etc.

Therefore, the present invention has following effects; when a radio system is selected from plural types of radio systems as a radio system for use in paging, the optimum radio system for the mobile terminal to be paged can be selected; when it is selected, traffic does not concentrate on a specific radio system, or no excess delay occurs when the mobile terminal starts communications.

What is claimed is:

1. A mobile communications network system which performs paging as a paging notification to a mobile terminal through one of various radio systems when a paging request is issued to the mobile terminal under a communications environment in which radio waves of various radio systems having different communication systems are used, comprising control means having a table, in which identification information of a mobile terminal, application identification information for use in communications of the mobile terminal are associated with location registration area information formed in one radio system, referring to the table when the paging request is issued and selecting a location registration area of a radio system corresponding to an application used in communications of a paging requested mobile terminal, and performing the paging on the selected location registration area;

first management means in which user information indicating personal preference of a communications condition of user of the mobile terminal;

transmission means for transmitting the user information registered in said first management means to a network system for performing paging on the mobile terminal;

obtaining means for obtaining advertisement information from various radio system; and selection means for selecting a specific radio system as a radio system for use in paging to the mobile terminal when the obtaining means obtains advertisement information from the specific radio system, wherein the first management means also manages the user information including the paging frequency of the mobile terminal, the mobile terminal further includes second management means for detecting and managing the terminal status of the mobile terminal, and, when the obtaining means detects the advertisement information from the plurality of radio systems, the selection means selects, as a radio system for use in paging to the mobile terminal, a radio system corresponding to the user information indicating the terminal status of the mobile terminal managed by the second management means and the paging frequency of the mobile terminal managed by the first management means from among the plurality of detected radio systems.

2. The mobile communications network system according to claim 1, wherein the control means detects the network status including at least one of the radio wave status in each radio system, the traffic status, the node fault, and changes the table according to the detected network status.

3. A mobile terminal which can perform communications through various radio systems under a communications environment in which radio waves of various radio systems having different communication systems are used, comprising:
- first management means in which user information indicating personal preference of a communications condition of user of the mobile terminal;
- transmission means for transmitting the user information registered in said first management means to a network system for performing paging on the mobile terminal;
- obtaining means for obtaining advertisement information from various radio systems; and
- selection means for selecting a specific radio system as a radio system for use in paging to the mobile terminal when the obtaining means obtains advertisement information from the specific radio system, wherein
- the first management means also manages the user information including the paging frequency, of the mobile terminal, the mobile terminal further includes second management means for detecting and managing the terminal status of the mobile terminal, and, when the obtaining means detects the advertisement information from the plurality of radio systems, the selection means selects, as a radio system for use in paging to the mobile terminal, a radio system corresponding to the user information indicating the terminal status of the mobile terminal managed by the second management means and the paging frequency of the mobile terminal managed by the first management means from among the plurality of detected radio systems.

4. A paging method for issuing a paging notification to a mobile terminal through one of various radio systems when a paging request is issued to the mobile terminal under a communications environment in which radio waves of various radio systems having different radio systems are used, wherein
- when the paging request is issued, a radio system of the various radio systems is selected depending on an application used in communications of a paging requested mobile terminal, and the paging is performed through the selected radio system and comprising
- first management step in which user information indicating personal preference of a communications condition of user of the mobile terminal;
- transmission step for transmitting the user information registered in said first management step to a network system for performing paging on the mobile terminal;
- obtaining step for obtaining advertisement information from various radio system; and
- selection step for selecting a specific radio system as a radio system for use in paging to the mobile terminal when the obtaining step obtains advertisement information from the specific radio system, wherein
- the first management step also manages the user information including the paging frequency of the mobile terminal, the mobile terminal further includes second management step for detecting and managing the terminal status of the mobile terminal, and, when the obtaining step detects the advertisement information from the plurality of radio systems, the selection step selects, as a radio system for use in paging to the mobile terminal, a radio system corresponding to the user information indicating the terminal status of the mobile terminal managed by the second management step and the paging frequency of the mobile terminal managed by the first management step from among the plurality of detected radio systems.

5. The paging method according to claim 4, wherein
- one of the various radio systems is selected, and the paging is performed through the selected radio system according to at least one of a network status of the various radio systems, user information indicating personal preference of a communications condition of a user of a mobile terminal, a location registration request from a mobile terminal to a specific radio system, a terminal status of a mobile terminal, and a location registration request to a radio system selected according to user information indicating a paging frequency of the mobile terminal.

* * * * *